United States Patent
Vanimisetti et al.

(10) Patent No.: US 9,662,738 B2
(45) Date of Patent: May 30, 2017

(54) WELDING ELECTRODE AND METHOD OF FORMING A RESISTANCE SPOT WELD JOINT

(71) Applicant: GM GLOBAL TECHNOLOGY OPERATIONS LLC, Detroit, MI (US)

(72) Inventors: Sampath K. Vanimisetti, Karnataka (IN); David R. Sigler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 542 days.

(21) Appl. No.: 14/305,461

(22) Filed: Jun. 16, 2014

(65) Prior Publication Data

US 2014/0319105 A1    Oct. 30, 2014

Related U.S. Application Data

(62) Division of application No. 13/049,960, filed on Mar. 17, 2011, now Pat. No. 8,785,807.

(51) Int. Cl.
*B23K 11/00* (2006.01)
*B23K 11/11* (2006.01)
(Continued)

(52) U.S. Cl.
CPC ......... *B23K 11/115* (2013.01); *B23K 11/3018* (2013.01); *B23K 35/0205* (2013.01); *B23K 35/0261* (2013.01)

(58) Field of Classification Search
CPC .. A61K 2300/00; A61K 31/135; A61K 31/15; A61K 31/40; A61K 31/42; A61K 31/455; A61K 31/13; A61K 31/47; A61K 31/44; A61K 31/12; A61K 31/495; A61K 31/535; A61K 31/35; A61K 31/14;
(Continued)

(56) References Cited

U.S. PATENT DOCUMENTS 3,909,581 A * 9/1975 Stone ................. B23K 11/3009
219/119
4,588,870 A * 5/1986 Nadkarni ........... B23K 35/0205
219/118
(Continued)

FOREIGN PATENT DOCUMENTS

DE    102009019237 A1    11/2009

*Primary Examiner* — Quang D Thanh
*Assistant Examiner* — Joseph Iskra
(74) *Attorney, Agent, or Firm* — Quinn IP Law (57) ABSTRACT

A welding electrode includes an electrode holder and an electrode cap removably attached to the holder and having a central longitudinal axis. The cap includes a body having an end, and a welding surface that is substantially smooth and free from any grooves defined therein, and has a first diameter of from about 7 to 10 mm, a first radius of curvature, and a second radius of curvature that is different from the first radius. The cap includes a skirt portion extending away from the body and configured to bear against the holder. The skirt portion has a first face that is substantially parallel to the axis and spaced apart from the surface. The body has a second face interconnecting the first face and the surface, and the body tapers from the first face to the surface. A method of forming a resistance spot weld joint is also disclosed.

20 Claims, 5 Drawing Sheets

(51) Int. Cl.
*B23K 11/30* (2006.01)
*B23K 35/02* (2006.01)

(58) Field of Classification Search
CPC .. A61K 45/06; B23K 11/115; B23K 11/3018;
B23K 35/0205; B23K 35/0261
USPC ........ 219/50, 55, 56, 59.1, 60 R, 64, 72, 74,
219/75, 76.1, 76.14, 78.01, 80, 84, 86.1,
219/86.8, 87, 89, 91.2, 92, 93, 98, 108,
219/109, 110, 117.1, 118, 119, 120,
219/121.11, 124.1, 124.22, 124.34, 125.1,
219/125.12, 130.1, 130.21, 13.4, 130.51,
219/136, 137 WM, 137 PS, 137 R, 137.2,
219/137.7, 137.71, 145.1, 145.23, 146.1
See application file for complete search history.

(56) References Cited

U.S. PATENT DOCUMENTS

| | | | | |
|---|---|---|---|---|
| 4,682,487 | A | * | 7/1987 | Kaeseler .............. B23K 35/402 |
| | | | | 219/119 |
| 4,918,990 | A | * | 4/1990 | Fowler .................. B23K 11/25 |
| | | | | 219/119 |
| 4,954,687 | A | * | 9/1990 | Bush .................. B23K 11/3018 |
| | | | | 219/119 |
| 5,021,627 | A | * | 6/1991 | Bersch .............. B23K 35/0205 |
| | | | | 219/119 |
| 2006/0081563 | A1 | | 4/2006 | Ueda et al. |
| 2008/0078749 | A1 | * | 4/2008 | Sigler .................... B23B 5/166 |
| | | | | 219/119 |
| 2009/0127232 | A1 | | 5/2009 | Sigler et al. |

* cited by examiner

WELDING ELECTRODE AND METHOD OF FORMING A RESISTANCE SPOT WELD JOINT

CROSS-REFERENCE TO RELATED APPLICATIONS

This application is a divisional of and claims the benefit of priority from U.S. application Ser. No. 13/049,960, filed on Mar. 17, 2011, which is hereby incorporated by reference in its entirety.

TECHNICAL FIELD

The present disclosure generally relates to resistance spot welding, and more specifically, to a welding electrode and a method of forming a resistance spot weld joint in a workpiece.

BACKGROUND

Resistance spot welding may be used to join steel substrates. In general, resistance spot welding may include clamping a workpiece, e.g., the steel substrates to be joined, between two welding electrodes with a force, and passing an electrical current from one welding electrode, through the workpiece, to the second welding electrode for a time period to thereby complete an electrical circuit. The electrical current generates heat from electrical resistance within the workpiece, at the substrate-to-substrate faying interface, and at both of the electrode-to-workpiece interfaces. The heat momentarily melts the steel substrates at the substrate-to-substrate faying interface to form a weld nugget, i.e., a resistance spot weld joint, and thereby joins the steel substrates.

SUMMARY

A method of forming a resistance spot weld joint in a workpiece includes disposing the workpiece between a first welding electrode and a second welding electrode. The workpiece includes a first steel substrate disposed in contact with a second steel substrate to define a faying interface therebetween. Each of the first welding electrode and the second welding electrode includes an electrode holder, and an electrode cap removably attached to the electrode holder and having a central longitudinal axis. The electrode cap includes a body having a proximal end and a welding surface spaced apart from the proximal end. The welding surface is substantially smooth and free from any grooves defined therein, and has a first diameter of from about 7 mm to about 10 mm, a first radius of curvature, and a second radius of curvature that is different from the first radius of curvature. The electrode cap also includes a skirt portion extending away from the body along the central longitudinal axis. The skirt portion is configured to bear against the electrode holder to thereby removably attach the electrode cap to the electrode holder. The skirt portion has a first face that is substantially parallel to the central longitudinal axis and spaced apart from the welding surface. The body has a second face interconnecting the first face and the welding surface. Further, the body tapers from the first face to the welding surface along the second face. The method further includes contacting the workpiece with the welding surface of each of the first welding electrode and the second welding electrode so as to define a first welding interface between the first steel substrate and the first welding electrode, and a second welding interface between the second steel substrate and the second welding electrode. The method also includes inducing each of a first quantity of resistance heat over a first area of the first welding interface, a second quantity of resistance heat over a second area of the second welding interface, a third quantity of resistance heat over a third area of the faying interface, a fourth quantity of resistance heat within the first steel substrate, and a fifth quantity of resistance heat within the second steel substrate. Each of the third quantity of resistance heat, the fourth quantity of resistance heat, and the fifth quantity of resistance heat is less than either of the first quantity of resistance heat and the second quantity of resistance heat. The method further includes maximizing each of a first ratio of the first area to the third area, and a second ratio of the second area to the third area to thereby form the resistance spot weld joint in the workpiece.

In one embodiment, the welding surface includes a protuberance spaced apart from the second face and having the first radius of curvature, and a shoulder adjoining the protuberance.

In another embodiment, the second radius of curvature is greater than the first radius of curvature.

The method enables formation of a resistance spot weld joint that exhibits excellent high-cycle fatigue life, excellent tensile strength in peel, and a reduced susceptibility to weld joint surface crack formation. That is, the resistance spot weld joint formed by the method is optimized to withstand a high number of cycles of tensile shear load applied to each of the first steel substrate and the second steel substrate. The method enables formation of the resistance spot weld joint that optimally penetrates the first steel substrate and the second steel substrate at the faying interface to thereby join the second steel substrate to the first steel substrate. That is, the first quantity of resistance heat and the second quantity of resistance heat are distributed over an optimal portion of the first welding interface and the second welding interface, respectively, to form the resistance spot weld joint. More specifically, the method maximizes the first ratio and the second ratio, and promotes formation of the resistance spot weld joint having, for example, an hourglass shape. That is, each of the first steel substrate and the second steel substrate may have a heat-affected zone adjacent the resistance spot weld joint and having a boundary, wherein the boundary and the faying interface may define an angle therebetween of greater than about 75°, e.g., from about 80° to about 120°. The method maximizes the angle between the boundary and the welding interface so that the heat-affected zone within the first steel substrate may combine with the heat-affected zone within the second steel substrate to form a substantially hourglass shape.

The method also enables downgaging and thickness reduction of the first and second steel substrates, without an accompanying loss of fatigue strength or tensile strength in peel. As such, the method is suitable for applications requiring excellent tensile strength in peel, fatigue strength, and fatigue life without an accompanying increased thickness of the steel substrates. The method optimally controls welding parameters to increase a shoulder diameter of the resistance spot weld joint while maintaining a waist diameter of the resistance spot weld joint at the faying interface. In addition, the method redirects weld current flux lines and distributes contact pressure and contact resistance across the first and second welding interfaces so as to generate an optimal distribution of resistance heat at the first and second welding interfaces.

The above features and advantages and other features and advantages of the present disclosure are readily apparent from the following detailed description of the best modes for carrying out the disclosure when taken in connection with the accompanying drawings.

DETAILED DESCRIPTION

Figure 1:
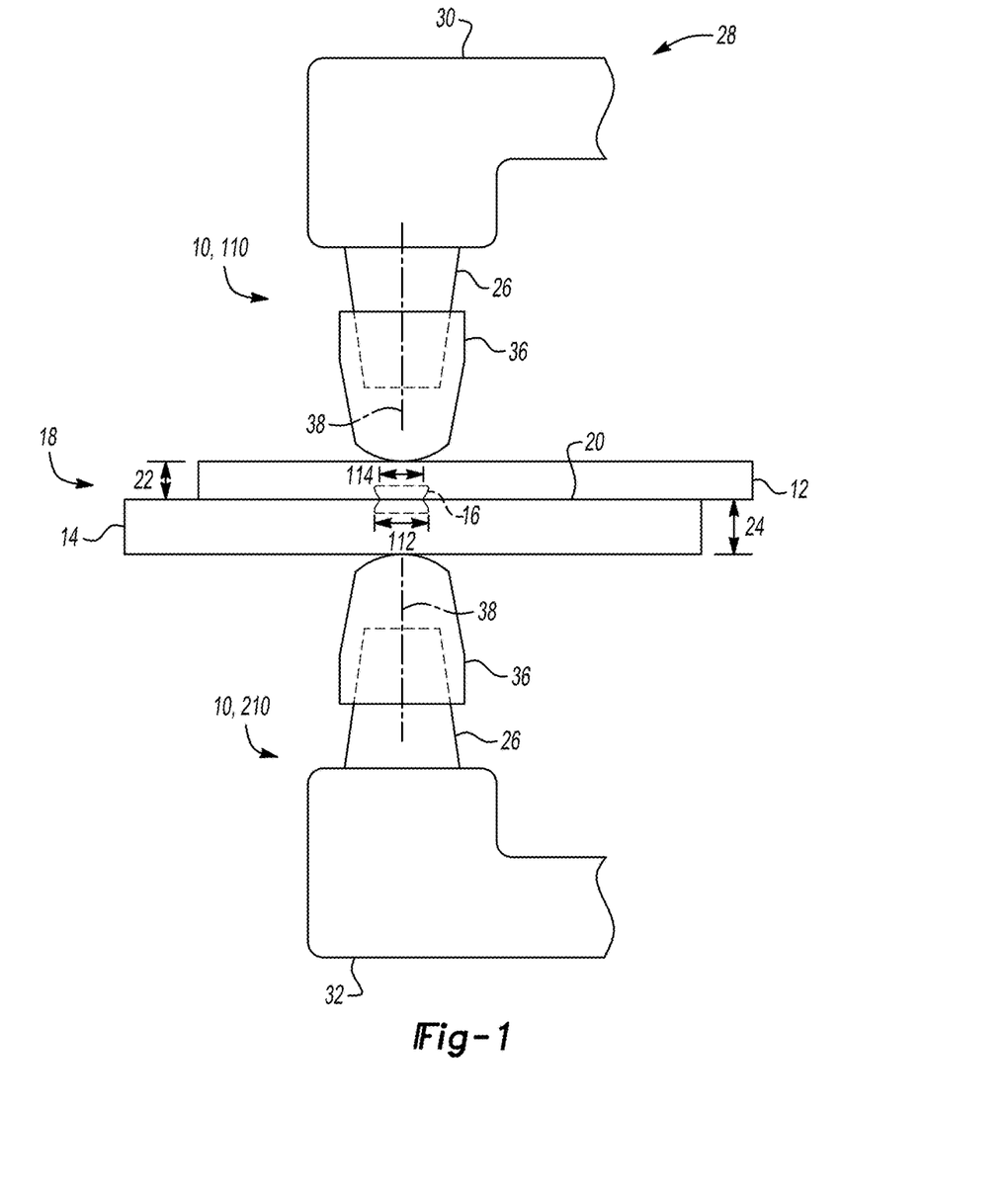
FIG. 1 is a schematic fragmentary side view of a workpiece disposed between two welding electrodes for a resistance spot welding operation, wherein each of the welding electrodes includes an electrode holder and an electrode cap removably attached to the electrode holder.

Referring to the Figures, wherein like reference numerals refer to like elements, a welding electrode is shown generally at 10 in FIG. 1. As set forth in more detail below, the welding electrode 10 may be useful for applications requiring a first steel substrate 12 joined to a second steel substrate 14 by a resistance spot weld joint or nugget 16 having maximized tensile strength in peel, fatigue strength, fatigue life, and resistance to formation of weld surface cracks. A method of forming the resistance spot weld joint 16 is also disclosed herein. The welding electrode 10 and method may be useful for automotive applications requiring welded components. However, the welding electrode 10 and method may also be useful for non-automotive applications, such as, but not limited to, aviation, rail, and construction applications.

The method of forming the resistance spot weld joint 16 in a workpiece 18 is described with reference to FIG. 1. As shown in FIG. 1, the workpiece 18 includes the first steel substrate 12 disposed in contact with the second steel substrate 14 to define a faying interface 20 therebetween. It is to be appreciated that the Figures are not necessarily drawn to scale. The first steel substrate 12 may be formed from any suitable steel for a desired application of the workpiece 18 and method. For example, the first steel substrate 12 may be formed from steels such as, but not limited to, low carbon steels; high-strength low-alloy (HSLA) steels including ferrite and carbon and/or nitrogen precipitates of titanium, vanadium, and/or niobium; advanced high strength steels (AHSS); and combinations thereof. In particular, the first steel substrate 12 may be formed from suitable advanced high strength steels including, but not limited to, dual phase (DP) steels including ferrite and martensite; transformation induced plasticity (TRIP) steels including ferrite, and austenite and bainite; complex phase (CP) steels including ferrite, martensite, bainite, and carbon and/or nitrogen precipitates of niobium, titanium, and/or vanadium; martensitic steels; and combinations thereof.

Referring again to FIG. 1, the first steel substrate 12 may have a first thickness 22 selected according to the desired application of the workpiece 18. For example, the first thickness 22 may be from about 0.5 mm to about 6 mm. For automotive applications in particular, the first thickness 22 of the first steel substrate 12 may be from about 1 mm to about 3 mm.

As further shown in FIG. 1, the workpiece 18 also includes the second steel substrate 14. The second steel substrate 14 may also be formed from any suitable steel according to the desired application of the workpiece 18. For example, for applications including strength and durability, the second steel substrate 14 may also be formed from steels such as, but not limited to, low carbon steels; high-strength low-alloy (HSLA) steels including ferrite and carbon and/or nitrogen precipitates of titanium, vanadium, and/or niobium; advanced high strength steels (AHSS); and combinations thereof. In particular, the second steel substrate 14 may be formed from suitable advanced high strength steels including, but not limited to, dual phase (DP) steels including ferrite and martensite; transformation induced plasticity (TRIP) steels including ferrite, and austenite and bainite; complex phase (CP) steels including ferrite, martensite, bainite, and carbon and/or nitrogen precipitates of niobium, titanium, and/or vanadium; martensitic steels; and combinations thereof.

Therefore, at least one of the first steel substrate 12 and the second steel substrate 14 of the workpiece 18 may be formed from advanced high strength steel. However, the first steel substrate 12 and the second steel substrate 14 may be formed from the same or different steel.

Referring again to FIG. 1, the second steel substrate 14 may have a second thickness 24 that is different from the first thickness 22 of the first steel substrate 12. For example, the second thickness 24 may be greater than the first thickness 22. Alternatively, the first thickness 22 and the second thickness 24 may be approximately the same. For example, the second thickness 24 may also be from about 0.5 mm to about 6 mm. For automotive applications in particular, the second thickness 24 may be from about 1 mm to about 3 mm. Therefore, as shown in FIG. 1, the resistance spot weld joint 16 may be formed to join the first substrate 12 having the first thickness 22 of about 1.6 mm and the second substrate 14 having the second thickness 24 of about 3 mm.

Figure 5:
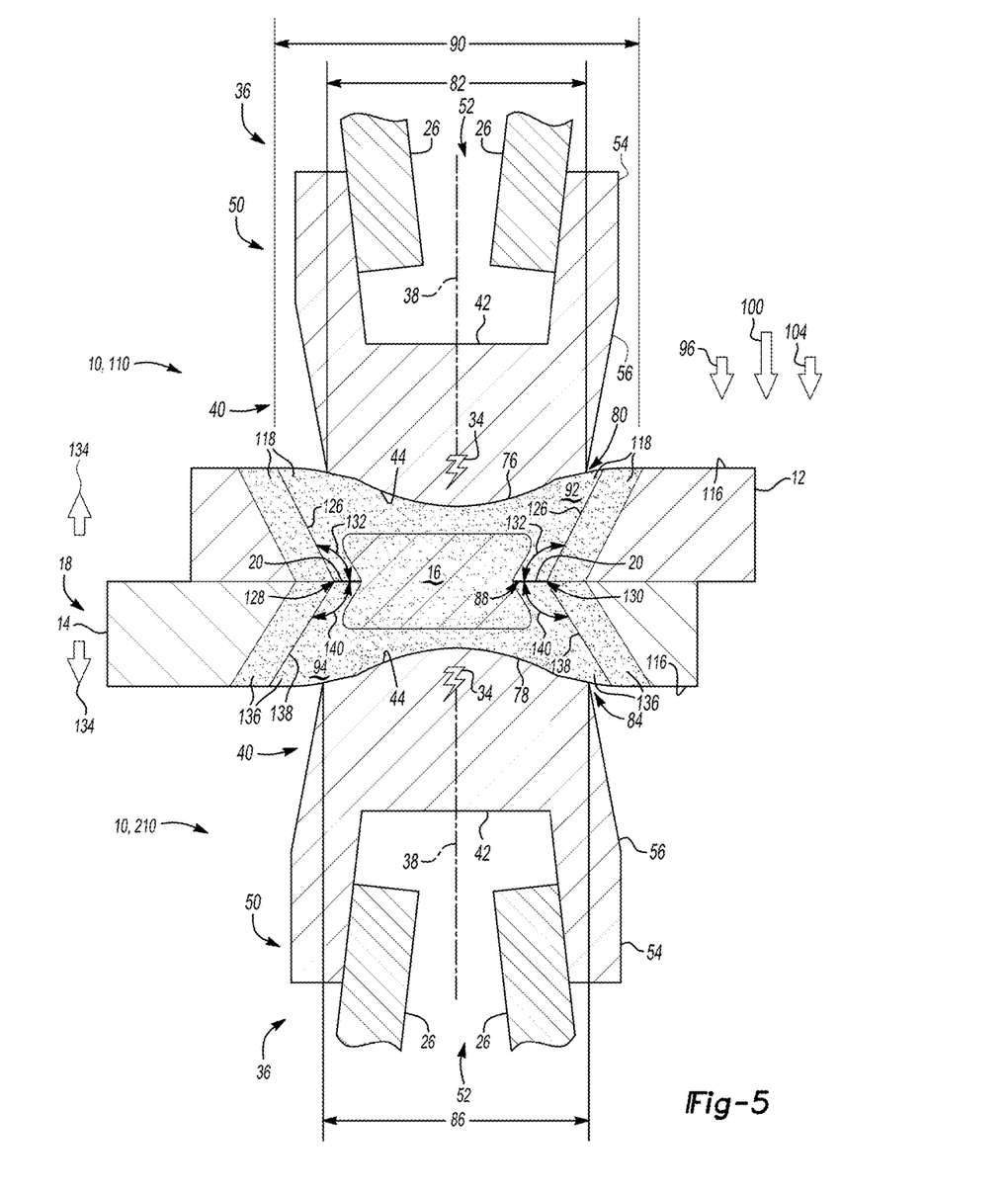
FIG. 5 is a schematic fragmentary cross-sectional view of a substantially hourglass-shaped resistance spot weld joint formed in the workpiece of FIG. 1.

As shown in FIGS. 1 and 5, the second steel substrate 14 is disposed in contact with the first steel substrate 12 to define the faying interface 20 therebetween. For example, the first steel substrate 12 may be aligned (not shown) or offset (FIGS. 1 and 5) with the second steel substrate 14 so as to contact the second steel substrate 14 at the faying interface 20. The first steel substrate 12 and the second steel substrate 14 may face and contact each other at the faying interface 20 in a lap-shear configuration, i.e., in an overlapping configuration, as shown in FIGS. 1 and 5.

Referring again to FIG. 1, the method includes disposing the workpiece 18 between a first welding electrode 110 and a second welding electrode 210. For the method, the workpiece 18 may be disposed or placed between the first welding electrode 110 and the second welding electrode 210 by any manner, e.g., by hand or by machine.

As shown in FIG. 1, each of the first welding electrode 110 and the second welding electrode 210 includes an electrode holder 26. Since each of the first welding electrode 110 and the second welding electrode 210 is substantially identical in structure and function, for ease of description, only one welding electrode, referenced by numeral 10, will be described and referenced. The electrode holder 26 may be attached to a welding gun 28, and more specifically to an upper arm 30 or a lower arm 32 of the welding gun 28. The welding gun 28 may be suitably configured according to the application of the workpiece 18. For example, the welding gun 28 may be a straight-acting gun or a rocker gun. In addition, the welding gun 28 may be controlled and/or actuated by pneumatics, hydraulics, electricity, servomotors, and combinations thereof.

Each of the upper arm 30 and the lower arm 32 of the welding gun 28 may be movable, or one of the upper arm 30 and lower arm 32 may be stationary with respect to the other arm 30, 32. The welding gun 28 may generally also include an electrical, pneumatic, and/or mechanical apparatus (not shown) for positioning the welding gun 28 and/or one or both of the arms 30, 32 in a desired location, and cooling circuitry (not shown) for maintaining a working temperature of the welding gun 28. Further, the welding gun 28 may be a component of a fixed welding apparatus (not shown) or a robot-carried welding apparatus (not shown).

Although depicted generally in FIG. 1, the upper arm 30 and the lower arm 32 may be spaced apart from one another and positionable to contact the first steel substrate 12 and the second steel substrate 14. Therefore, the welding gun 28 may include two electrode holders 26, e.g., one electrode holder 26 for the upper arm 30 and one electrode holder 26 for the lower arm 32. Each of the two electrode holders 26 may also be substantially identical in structure and function, and the representative electrode holder 26 connected to the upper arm 30 is described hereinbelow.

With continued reference to FIG. 1, the electrode holder 26 may be hollow to house cooling circuitry (not shown), and may taper from the upper arm 30 toward the first steel substrate 12. Further, since the electrode holder 26 may conduct a weld current 34 (FIGS. 5 and 6) to the workpiece 18, the electrode holder 26 may be formed from an electrically-conductive metal, e.g., copper or a copper alloy.

Referring again to FIG. 1, the welding electrode 10 further includes an electrode cap 36 removably attached to the electrode holder 26 and having a central longitudinal axis 38. That is, the welding electrode 10 may be removed from the electrode holder 26 after resistance spot welding operations and/or for cleaning, redressing, or maintenance operations.

As shown in FIGS. 2A-5, the electrode cap 36 includes a body 40 having a proximal end 42 and a welding surface 44 spaced apart from the proximal end 42. As shown in FIG. 5, the welding surface 44 is at least partially rounded and may be configured for contact with either of the first steel substrate 12 and the second steel substrate 14 during formation of the resistance spot weld joint 16, as set forth in more detail below. Referring to FIGS. 2A-5, the welding surface 44 may be substantially perpendicular to the central longitudinal axis 38. However, although not shown, the welding surface 44 may alternatively be disposed in a non-perpendicular relationship with the central longitudinal axis 38. That is, the welding surface 44 may be disposed off-center with respect to the central longitudinal axis 38 wherein the welding surface 44 is "tilted" or "angled" with respect to the electrode holder 26. For example, the welding surface 44 may have a second central longitudinal axis (not shown) that may intersect the central longitudinal axis 38 of the electrode cap 36 to form up to about a 30° angle. Such a configuration of the welding surface 44 and body 40 may be useful for applications requiring positioning the electrode cap 36 into spaces having small dimensions.

The welding surface 44 is substantially smooth and free from any grooves defined therein. That is, the welding surface 44 does not define any grooves or ridges and does not have a surface roughness. Rather, the welding surface 44 is substantially smooth and uniform, and free from, for example, cross-hatching or other surface texture such as surface roughness defined by craters having peak-to-valley dimensions. However, it is to be appreciated that the terminology "substantially smooth and free from any grooves defined therein" may allow for light and/or unintentional residual marks from forging or machining of the welding surface 44, but excludes deliberate or by-design grooves or ridges such as cross-hatching or surface roughening. The substantially smooth and groove-free welding surface 44 allows for sufficient contact and electrical conductivity with the workpiece 18 to achieve the improved resistance spot weld joint 16 (FIG. 5).

With continued reference to FIGS. 2A-5, the welding surface 44 has a first diameter (denoted at 46 in FIGS. 2A-4) of from about 7 mm to about 10 mm and a first radius of curvature (denoted at 48 in FIGS. 2A-4). The aforementioned first diameter 46 allows for forming the resistance spot weld joint 16 in comparatively thin gauges of steel substrates 12, 14 (FIG. 5), e.g., steel substrates 12, 14 having a thickness 22, 24 of from about 1 mm to about 3 mm. In addition, the welding surface 44 having the aforementioned first diameter 46 allows for excellent contact pressure and electrical conductivity between the electrode cap 36 and the steel substrates 12, 14.

Since the welding surface 44 has the first radius of curvature 48, the welding surface is not entirely flat, as shown in FIGS. 2A-4. Rather, at least a portion of the welding surface 44 is crowned or rounded. In the non-limiting variations shown in FIGS. 2A and 2B, the first radius of curvature 48 may be from about 40 mm to about 100 mm.

Referring again to FIGS. 2A-5, the electrode cap 36 also includes a cylindrical or tubular skirt portion 50 extending away from the body 40 along the central longitudinal axis 38 and defining a cooling channel 52. Although not shown, the cooling circuitry, such as water-filled tubing or nozzles, may be disposed within the cooling channel 52 to maintain a desired working temperature of the electrode cap 36, welding surface 44, and electrode holder 26. The cooling channel 52 may therefore extend the operating life of the electrode cap 36.

Moreover, the skirt portion 50 is configured to bear against the electrode holder 26 to thereby removably attach the electrode cap 36 to the electrode holder 26. That is, the electrode cap 36 may be attached to the electrode holder 26 via an interference fit. In one example, as best shown in FIG. 5, the skirt portion 50 may be configured to receive and bear against the electrode holder 26 to define the cooling channel 52 between the proximal end 42 and the electrode holder 26, and thereby removably attach the electrode cap 36 to the electrode holder 26. In another example, as best shown in FIG. 2B, the skirt portion 50 may define the cooling channel 52, and the electrode holder 26 may be configured to surround and bear against the skirt portion 50. Therefore, the electrode cap 36 may be configured as a male electrode cap 36, as best shown in FIG. 2B, or a female electrode cap 36, as best shown in FIGS. 1, 2A, and 3-5.

Referring now to FIGS. 2A-4, the skirt portion 50 has a first face 54 that is substantially parallel to the central longitudinal axis 38 and spaced apart from the welding surface 44. That is, the first face 54 is generally cylindrical and concentric with the central longitudinal axis 38. Further, the body 40 has a second face 56 interconnecting the first face 54 and the welding surface 44, and the body 40 tapers from the first face 54 to the welding surface 44 along the second face 56. For example, in one variation, the body 40 may taper at a single, constant slope (denoted at 58 in FIGS. 2A-4) from the first face 54 to the welding surface 44 along the second face 56. As used herein, the terminology "slope" refers to a change in the rise 60, i.e., the y-dimension along the central longitudinal axis 38, over a change in the run 62, i.e., the x-dimension perpendicular to the central longitudinal axis 38, of the second face 56. Alternatively, although not shown, in another variation, the second face 56 may be arcuate, and may change slope 58, curve, or bend from the first face 54 to the welding surface 44. Therefore, the second face 56 is not cylindrical, but rather may be generally conical or spherical, may have a convex taper (not shown), or may have a concave taper (not shown). Such shape and taper provides the electrode cap 36 with excellent strength and allows the electrode cap 36 to be positioned into spaces having small dimensions.

Figure 2A:
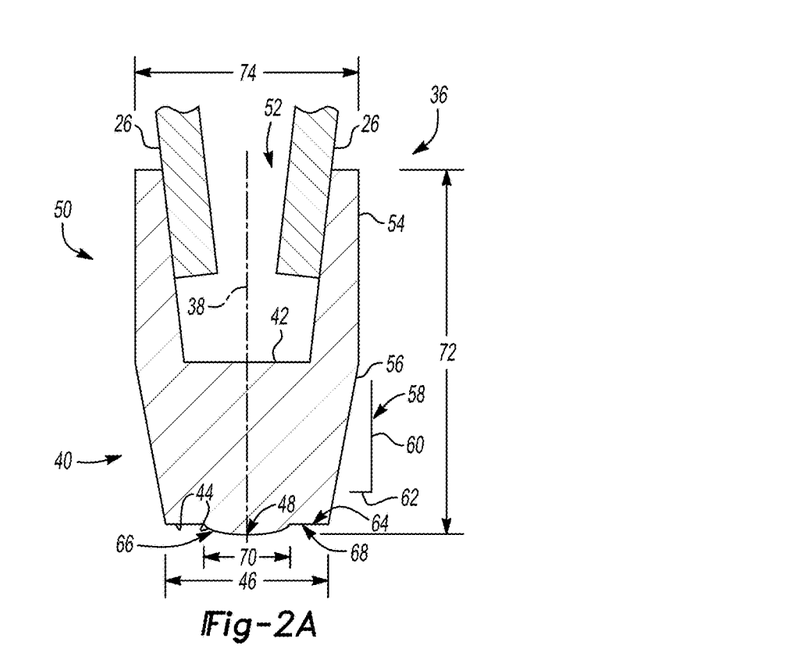
FIG. 2A is a schematic fragmentary cross-sectional view of another variation of the electrode cap of FIG. 1.
Figure 2B:
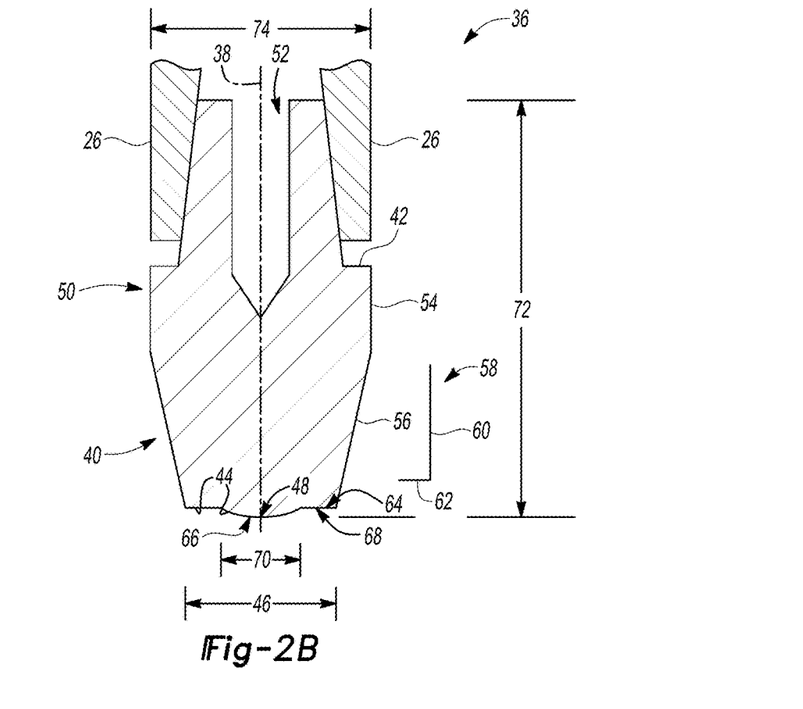
FIG. 2B is a schematic fragmentary cross-sectional view of yet another variation of the electrode cap of FIG. 1.
Figure 3:
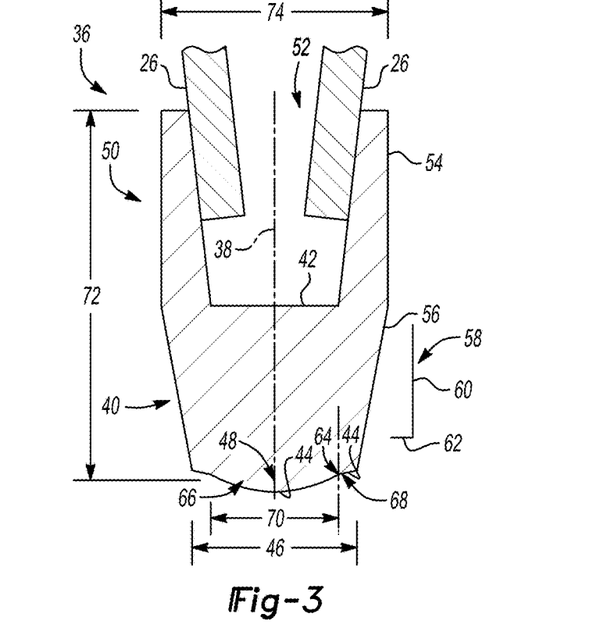
FIG. 3 is a schematic fragmentary cross-sectional view of a further variation of the electrode cap of FIG. 1.

With continued reference to FIGS. 2A-4, the welding surface 44 further has a second radius of curvature (denoted at 64 in FIGS. 2A-4) that is different from the first radius of curvature 48. For example, as shown in FIGS. 2A-3, the welding surface 44 may include a protuberance 66 spaced apart from the second face 56 and having the first radius of curvature 48, and a shoulder 68 adjoining the protuberance 66. In this variation, the first radius of curvature 48 may be from about 8 mm to about 40 mm. Further, the protuberance 66 may have a second diameter 70 of from about 4 mm to about 7 mm. Therefore, the protuberance 66 may be centered on the welding surface 44 so as to be intersected by the central longitudinal axis 38, may have the first radius of curvature 48 of from about 8 mm to about 40 mm, and the second diameter 70 of from about 4 mm to about 7 mm. Alternatively, although not shown, the protuberance 66 may not be centered on the welding surface 44, but may instead have a third longitudinal axis (not shown) that intersects the central longitudinal axis 38 to form an angle of up to about 30°. That is, the protuberance 66 may be disposed off-center and/or may be "titled" or "angled" with respect to the central longitudinal axis 38 of the electrode cap 36.

With continued reference to FIGS. 2A and 2B, the shoulder 68 of the welding surface 44 adjoins the protuberance 66. In the non-limiting variation of the electrode cap 36 shown in FIGS. 2A and 2B, the shoulder 68 may be substantially parallel to the proximal end 42 of the body 40. That is, the second radius of curvature 64 may be substantially greater than the first radius of curvature 48 so that the shoulder 68 may appear "flat" as compared to the portion of the welding surface 44 formed by the first radius of curvature 48 of the protuberance 66. For this variation, the body 40 tapers from the first face 54 to the welding surface 44 along the second face 56 so that the shoulder 68 adjoins the second face 56.

Referring now to FIG. 3, in another non-limiting variation, the welding surface 44 may further have the second radius of curvature 64 that is less than the first radius of curvature 48. That is, the welding surface 44 may have two rounded portions. In this example, the welding surface 44 also includes the protuberance 66 spaced apart from the second face 56 and having the first radius of curvature 48, and the shoulder 68 adjoining the protuberance 66. In this variation, the first radius of curvature 48 may be from about 8 mm to about 40 mm. Further, the protuberance 66 may have the second diameter 70 of from about 4 mm to about 7 mm. Therefore, the protuberance 66 may be centered on the welding surface 44 so as to be intersected by the central longitudinal axis 38, may have the first radius of curvature 48 of from about 8 mm to about 40 mm, and the second diameter 70 of from about 4 mm to about 7 mm. Alternatively, although not shown, the protuberance 66 may be not be centered on the welding surface 44 so that the central longitudinal axis 38 may not intersect the protuberance 66. For example, the protuberance 66 may instead have the third longitudinal axis (not shown) that intersects the central longitudinal axis 38 to form an angle of up to about 30°. That is, the protuberance 66 may be disposed off-center and/or may be "titled" or "angled" with respect to the central longitudinal axis 38 of the electrode cap 36.

Therefore, in the non-limiting variation shown in FIGS. 2A, 2B, and 3, the welding electrode 10 (FIG. 1) includes the electrode holder 26 and the electrode cap 36 removably attached to the electrode holder 26 and having the central longitudinal axis 38. The electrode cap 36 includes the body 40 having the proximal end 42 and the welding surface 44 spaced apart from the proximal end 42, wherein the welding surface 44 is substantially smooth and free from any grooves defined therein, and has the first diameter 46 of from about 7 mm to about 10 mm. The welding surface 44 includes the protuberance 66 spaced apart from the second face 56, wherein the protuberance 66 has the first radius of curvature 48 of from about 8 mm to about 40 mm and the second diameter 70 of from about 4 mm to about 7 mm. The welding surface 44 also includes the shoulder 68 adjoining the protuberance 66, and has the second radius of curvature 64 that is different from the first radius of curvature 48.

With continued reference to FIGS. 2A, 2B, 3, and 5, the electrode cap 36 includes the skirt portion 50 extending away from the body 40 along the central longitudinal axis 38 and defining the cooling channel 52. The skirt portion 50 is configured to bear against the electrode holder 26 to thereby removably attach the electrode cap 36 to the electrode holder 26. The skirt portion 50 has the first face 54 that is substantially parallel to the central longitudinal axis 38 and spaced apart from the welding surface 44. The body 40 has the second face 56 interconnecting the first face 54 and the welding surface 44. The body 40 tapers from the first face 54 to the welding surface 44 along the second face 56 so that the shoulder 68 adjoins the second face 56.

However, in the non-limiting variation as described with reference to FIG. 3, although the shoulder 68 of the welding surface 44 adjoins the protuberance 66, the shoulder 68 may have the second radius of curvature 64 of from about 40 mm to about 100 mm whereby the shoulder 68 is not substantially parallel to the proximal end 42 of the body 40. That is, the welding surface 44 may include two radii of curvature 48, 64, i.e., the first radius of curvature 48 of the protuberance 66 and the second radius of curvature 64 of the shoulder 68, so that both the protuberance 66 and the shoulder 68 are crowned or rounded. For this variation, the body 40 also tapers from the first face 54 to the welding surface 44 along the second face 56 so that the shoulder 68 adjoins the second face 56.

Figure 4:
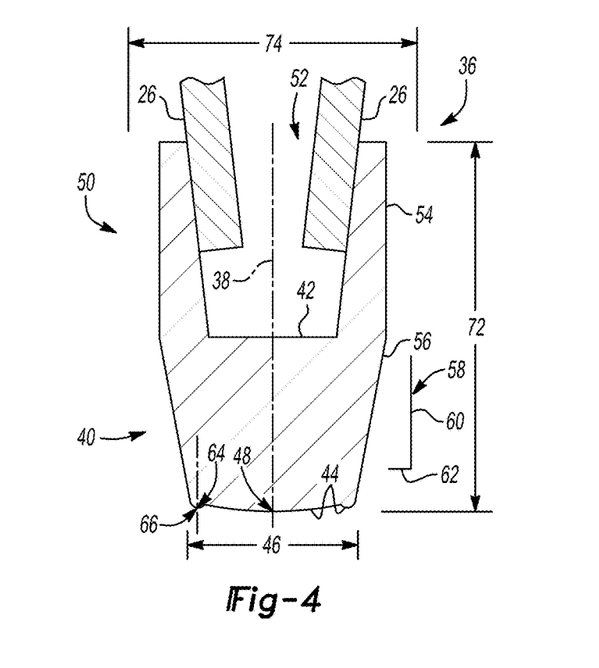
FIG. 4 is a schematic fragmentary cross-sectional view of an additional variation of the electrode cap of FIG. 1.

Referring now to FIG. 4, in yet another non-limiting variation, the welding surface 44 may include the protuberance 66 adjoining the second face 56 and having the second radius of curvature 64. In this non-limiting example, the protuberance 66 may appear as a circular bump abutting the second face 56 about the periphery of the welding surface 44. That is, the protuberance 66 may contact the second face 56 and may not be intersected by the central longitudinal axis 38 of the electrode cap 36. For this example, the first radius of curvature 48 may be from about 40 mm to about 100 mm. In contrast, the second radius of curvature 64 may be substantially smaller than the first radius of curvature. For example, the second radius of curvature 64 may be from about 0.1 mm to about 2 mm.

As shown in FIGS. 2A-4, the electrode cap 36 may have a length 72 of from about 21 mm to about 24.5 mm, e.g., about 22 mm. The electrode cap 36 may have an overall diameter 74 of from about 12.5 mm to about 19 mm, e.g., about 16 mm. Further, since the electrode cap 36 conducts the weld current 34 (FIGS. 5 and 6) to the first and second substrates 12, 14 (FIG. 5), the electrode cap 36 may be formed from an electrically-conductive metal such as copper or a copper alloy. Moreover, should the electrode cap 36 become worn, the electrode cap 36 may be redressed to the aforementioned dimensions using a suitable cutter blade (not shown) prepared with cutting surfaces shaped in complementary conformance with the first diameter 46, the first radius of curvature 48, and the second radius of curvature 64 and configured to machine the electrode cap 36 to define the welding surface 44.

Referring again to the method, as described with reference to FIG. 5, the method also includes contacting the workpiece 18 with the welding surface 44 of each of the first welding electrode 110 and the second welding electrode 210 so as to define a first welding interface 76 between the first steel substrate 12 and the first welding electrode 110, and a second welding interface 78 between the second steel substrate 14 and the second welding electrode 210. That is, contacting may be further defined as moving at least one of the upper arm 30 (FIG. 1) and the lower arm 32 (FIG. 1) toward the workpiece 18 so that the electrode cap 36 of the first welding electrode 110 touches the first steel substrate 12, and the electrode cap 36 of the second welding electrode 210 touches the second steel substrate 14 so as to dispose the workpiece 18 in electrically-conductive relationship with the first and second welding electrodes 110, 210. Further, contacting may include aligning the weld surfaces 44 of each of the electrode cap 36 of the first welding electrode 110 and the electrode cap 36 of the second welding electrode 210 so that the welding surfaces 44 of the first and second welding electrodes 110, 210 are positioned over the desired location of the resistance spot weld joint 16.

With continued reference to FIG. 5, the method also includes inducing each of a first quantity of resistance heat (denoted generally at 80 in FIG. 5) over a first area 82 of the first welding interface 76, a second quantity of resistance heat (denoted generally at 84 in FIG. 5) over a second area 86 of the second welding interface 78, a third quantity of resistance heat (denoted generally at 88 in FIG. 5) over a third area 90 of the faying interface 20, a fourth quantity of resistance heat (denoted generally at 92 in FIG. 5) within the first steel substrate 12, and a fifth quantity of resistance heat (denoted generally at 94 in FIG. 5) within the second steel substrate 14. The fourth quantity 92 of resistance heat and the fifth quantity 94 of resistance heat may each be characterized as bulk heat resistance within the respective first and second steel substrates 12, 14. Further, each of the third quantity 88 of resistance heat, the fourth quantity 92 of resistance heat, and the fifth quantity 94 of resistance heat is less than either of the first quantity 80 of resistance heat and the second quantity 84 of resistance heat, as set forth in more detail below. Therefore, the first welding interface 76 and the second welding interface 78 are each comparatively hotter than the faying interface 20 during formation of the resistance spot weld joint or nugget 16. As such, rather than cooling the first welding interface 76 and the second welding interface 78, the method increases the first quantity 80 and second quantity 84 of resistance heat at the first and second welding interfaces 76, 78, respectively, as compared to the third quantity 88, fourth quantity 92, and fifth quantity 94 of resistance heat.

In addition, referring again to FIG. 5, the method includes maximizing each of a first ratio of the first area 82 to the third area 90, and a second ratio of the second area 86 to the third area 90 to thereby form the resistance spot weld joint 16 in the workpiece 18. As such, the method distributes the first quantity 80 and second quantity 84 of resistance heat over an optimal portion of the first welding interface 76 and the second welding interface 78, respectively, to form the resistance spot weld joint 16. The method distributes each of the first quantity 80 and second quantity 84 of resistance heat over a comparatively larger area at the first welding interface 76 and second welding interface 78, respectively, than other methods of forming a resistance spot weld joint (not shown), and promotes formation of the resistance spot weld joint 16 having, for example, an hourglass shape, as shown in FIG. 5 and set forth in more detail below.

Figure 6:
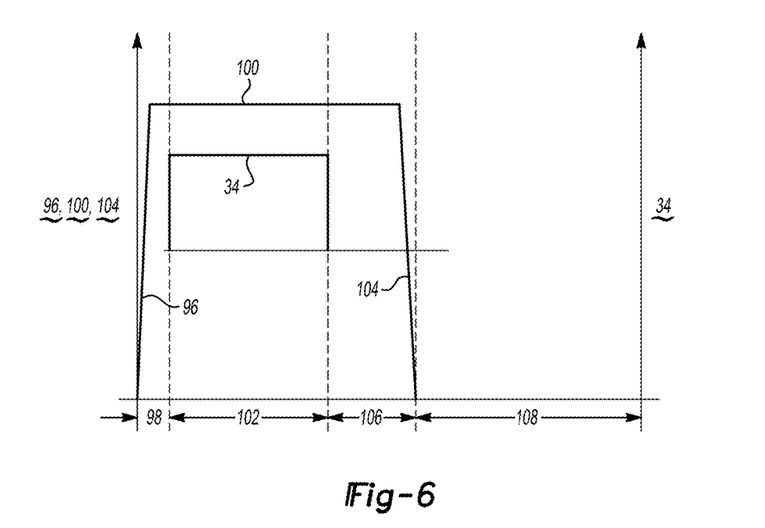
FIG. 6 is a schematic graphical representation of a method of forming the resistance spot weld joint of FIG. 5 in the workpiece of FIG. 5.

The first quantity 80, second quantity 84, third quantity 88, fourth quantity 92, and fifth quantity 94 of resistance heat may be induced in any suitable manner. As a non-limiting example, as described with reference to FIGS. 5 and 6, the method may further include, after contacting, applying a first force (denoted generally by arrow 96 in FIG. 5) to the workpiece 18 to thereby squeeze the workpiece 18 between the first welding electrode 110 and the second welding electrode 210 for a first duration 98 (FIG. 6) or squeeze time. The first duration 98 refers to the time required for initial closing of the upper arm 30 (FIG. 1) and the lower arm 32 (FIG. 1) of the welding gun 28 (FIG. 1) against the workpiece 18. Referring to FIG. 6, the first duration 98 may be from about 10 ms to about 1,000 ms, and the first force 96 may increase over the first duration 98 from about 0 kN to about 3.5 kN.

The method may further include, after applying the first force 96, applying a substantially constant second force (denoted generally by arrow 100 in FIG. 5) to the workpiece 18 for a second duration 102 (FIG. 6) or weld time. As a non-limiting example, the second force 100 may be from about 2.5 kN to about 3.5 kN. and the second duration 102 may be about from about 180 ms to about 220 ms. Therefore, the method may include applying the substantially constant second force 100 of about 3 kN over the entire second duration 102 of about 200 ms to the workpiece 18 so that the workpiece 18 is clamped between the first welding electrode 110 and the second welding electrode 210.

In addition, with continued reference to FIG. 5, the method may further include, simultaneous to applying the substantially constant second force 100, applying a weld current (denoted generally by 34 in FIGS. 5 and 6) to the workpiece 18 through the first welding electrode 110 and the second welding electrode 210 for the second duration 102 (FIG. 6) to thereby induce the first quantity 80 of resistance heat over the first area 82 of the first welding interface 76, the second quantity 84 of resistance heat over the second area 86 of the second welding interface 78, the third quantity 88 of resistance heat over the third area 90 of the faying interface 20, the fourth quantity 92 of resistance heat within the first steel substrate 12, and the fifth quantity 94 of resistance heat within the second steel substrate 14. That is, while the substantially constant second force 100 is applied to the workpiece 18, the weld current 34 may also be applied to the workpiece 18. More specifically, the weld current 34 may be direct current that may be stepped down through a transformer or voltage regulator (not shown) of the welding gun 28 (FIG. 1).

Referring to FIG. 6, as a non-limiting example, the weld current 34 may be from about 9 kA to about 11 kA, e.g., about 10.5 kA, over the entire second duration 102. That is, the weld current 34 may be constant over the entire second duration 102. Stated differently, the weld current 34 may be applied in a single continuous pulse, without an accompanying cool time between pulses. Referring to FIG. 5, the weld current 34 may be passed through the electrode holder 26 and respective welding electrode 110, 210 of each of the upper arm 30 (FIG. 1) and the lower arm 32 (FIG. 1) of the welding gun 28 (FIG. 1) so that the weld current 34 passes to the workpiece 18 at the first welding interface 76 and the second welding interface 78.

Referring again to FIG. 5, as the weld current 34 passes through the first welding interface 76 and the second welding interface 78, the specific shape and configuration of the electrode cap 36 set forth above modifies electrical resistance at the first and second welding interfaces 76, 78 by redistributing contact pressure of the respective welding electrode 110, 210 over the first area 82 and second area 86. The specific shape and configuration of the electrode cap 36 redirects weld current flow from the electrode cap 36 at the first steel substrate 12 and the second steel substrate 14 so that the first quantity 80 of resistance heat and the second quantity 84 of resistance heat are generated at the first welding interface 76 and the second welding interface 78, respectively. The weld current 34 generates heat, e.g., the first quantity 80, the second quantity 84, and the third quantity 88, from electrical resistance within the workpiece 18 at each of the first welding interface 76, the second welding interface 78, and the faying interface 20. The heat 80, 84, 88 momentarily melts the first steel substrate 12 and the second steel substrate 14 at the faying interface 20 to form the beginning of the resistance spot weld joint or nugget 16, and thereby begins to join the steel substrates 12, 14.

More specifically, application of the first, second, and third forces 96, 100, 104 via the aforementioned shape and configuration of the welding surface 44 dictates contact pressure, contact resistance, and contact area, i.e., the first and second areas 82, 86, between the first and second welding electrodes 110, 210 and the workpiece 18. The aforementioned shape and configuration of the welding surface 44 of the welding electrode 10, e.g., the first and second radii of curvature 48, 64 of the welding surface 44, reduces the contact pressure between the first and second welding electrodes 110, 210 and the respective steel substrate 12, 14, and therefore increases the contact resistance and first and second quantities 80, 84 of resistance heat at the first area 82 and the second area 86. The aforementioned shape and configuration of the electrode cap 36 distributes the first quantity 80 and second quantity 84 of resistance heat over the first and second areas 82, 86.

In addition, the aforementioned shape and configuration of the welding surface 44 and electrode cap 36 provides a theoretically negligible contact pressure, and therefore infinite contact resistance, at a periphery of the welding surface 44. In contrast, comparative welding electrodes (not shown) having a completely flat welding surface (not shown) that do not have a first radius 48 and a second radius 64 provide a theoretically infinite contact pressure, and therefore negligible contact resistance, at a periphery of the welding surface 44. Therefore, even when a total quantity of resistance heat 80, 84, 88, 92, 94 is similar between the welding electrode 36 and a comparative welding electrode (not shown), the first and second quantities 80, 84 of resistance heat are distributed over a larger first and second area 82, 86 for the welding electrode 36 having the welding surface 44. Therefore, the welding electrode 36 may form resistance spot weld joints 16 having a wider shoulder diameter 112 (FIG. 1) than waist diameter 114 (FIG. 1), and may have the aforementioned hourglass shape.

Referring again to FIGS. 5 and 6, the method may further include, after applying the substantially constant second force 100, applying a third force (denoted generally by arrow 104 in FIG. 5) to the workpiece 18 for a third duration 106 (FIG. 6) or hold time. That is, the third force 104 may be applied to the workpiece 18 after the weld current 34 is applied. The third duration 106 or hold time represents a time during which the first welding electrode 110 and the second welding electrode 210 are still disposed in contact with the first steel substrate 12 and the second steel substrate 14, respectively, but during which there is no weld current 34 passing through the welding electrodes 110, 210. The third duration 106 allows for continued formation of the resistance spot weld joint 16 on a microstructural level. For example, as described with reference to FIGS. 5 and 6, the method may further include applying the third force 104 to the workpiece 18 to begin to release the workpiece 18 from contact with the first welding electrode 110 and the second welding electrode 210 over the third duration 106 or hold time. Referring to FIG. 6, as a non-limiting example, the third duration 106 may be from about 40 ms to about 250 ms, and the third force 104 may decrease over the third duration 106 from about 3.5 kN to about 0 kN.

With continued reference to FIGS. 5 and 6, the method may further include, after applying the third force 104, releasing the first welding electrode 110 and the second welding electrode 210 from contact with the workpiece 18 for a fourth duration 108 (FIG. 6) or idle time to thereby form the resistance spot weld joint 16 in the workpiece 18. That is, no force may be applied to the workpiece 18 during the fourth duration 108, and the workpiece 18 may not contact either of the first welding electrode 110 and the second welding electrode 210 during the fourth duration 108 (FIG. 6). Therefore, the weld current 34 may not be applied through the first welding electrode 110 and the second welding electrode 210 for the first duration 98, the third duration 106, and the fourth duration 108. As a non-limiting example, the fourth duration 108 may be from about 1,000 ms to about 2,500 ms and may allow complete formation of the resistance spot weld joint 16 at the microstructural level.

As described with reference to FIG. 5, the electrode cap 36 and method spread the first force 96, the substantially constant second force 100, and the third force 104 over an area of the entire welding surface 44 of the electrode cap 36. Therefore, the welding surface 44 minimizes contact pressure with the workpiece 18 and increases both contact resistance and contact area, i.e., the first area 82 and the second area 86, at the first welding interface 76 and the second welding interface 78. Such increased contact resistance over a wider contact area 82, 86 generates the first quantity 80 and second quantity 84 of resistance heat and promotes broad heat generation at the first and second welding interfaces 76, 78.

Referring again to FIG. 5, since the first quantity 80 and second quantity 84 of resistance heat at the periphery of the workpiece 18 are each distributed over a sufficiently large area 82, 86 as compared to each of the third quantity 88 of resistance heat at the third area 90 of the faying interface 20 internal to the workpiece 18, the fourth quantity 92 of resistance heat within the first steel substrate 12, and the fifth quantity 94 of resistance heat within the second steel substrate 14, the weld current 34 may melt the steel substrates 12, 14 in such a way so as to form the resistance spot weld joint or nugget 16 having an hourglass shape. That is, as shown in FIG. 1, the resistance spot weld joint 16 may have a larger shoulder diameter 112 than waist diameter 114. In particular, the third quantity 88 of resistance heat may only minimally increase during formation of the resistance spot weld joint 16, while each of the first and second quantities 80, 84 of resistance heat greatly increases over the first and second welding interfaces 76, 78, respectively. Therefore, the third area 90 may also only minimally increase during formation of the resistance spot weld joint 16, while each of the first and second areas 82, 86 greatly increases over the first and second welding interfaces 76, 78. Stated differently, the method maximizes the first ratio of the first area 82 to the third area 90, and the second ratio of the second area 86 to the third area 90 to thereby form the resistance spot weld joint 16. Therefore, the first and second quantity 80, 84 of resistance heat may be broadly distributed over an optimal portion, i.e., the first and second areas 82, 86, of the first and second welding interfaces 76, 78, and the shoulder diameter 112 (FIG. 1) may be larger than the waist diameter 114 (FIG. 1) of the resistance spot weld joint 16. Stated differently, since the first quantity 80 and second quantity 84 of resistance heat is larger than the third quantity 88, fourth quantity 92, and fifth quantity 94 of resistance heat, the first and second quantity 80, 84 of resistance heat may be distributed over a comparatively broader portion, i.e., the first and second areas 82, 86, of the first and second welding interfaces 76, 78, as compared to other methods of forming a resistance spot weld (not shown) so that the shoulder diameter 112 of the resistance spot weld joint 16 may be larger than the waist diameter 114. Consequently, the resistance spot weld joint 16 may have an hourglass shape and accompanying excellent fatigue strength, tensile strength in peel, and resistance to weld surface crack formation.

As described with reference to FIG. 1, the resistance spot weld joint 16 may penetrate the first steel substrate 12 and the second steel substrate 14 at the faying interface 20 to thereby join the second steel substrate 14 to the first steel substrate 12. The resulting resistance spot weld joint or nugget 16 may have a generally circular shape when viewed from above, and an hourglass shape when viewed in cross-section. In another example, although not shown, the resulting spot weld joint 16 may have an oval shape when viewed in cross-section. The waist diameter 114 of the resistance spot weld joint 16 at the faying interface 20 may be approximately equal to four times the square root of the thickness 22, 24 (FIG. 1) of the thinner of the two steel substrates 12, 14. For example, as set forth above, the second thickness 24 may be greater than the first thickness 22, whereby the waist diameter 114 of the resistance spot weld joint 16 at the faying interface 20 may be approximately equal to four times the square root of the first thickness 22 of the first steel substrate 12. Likewise, for applications where the first thickness 22 is greater than the second thickness 24, the waist diameter 114 of the resistance spot weld joint 16 at the faying interface 20 may be approximately equal to four times the square root of the second thickness 24 of the second steel substrate 14. For automotive applications in particular, the waist diameter 114 of the resistance spot weld joint 16 may be from about 4 mm to about 8 mm.

As shown in FIG. 5, each of the first steel substrate 12 and the second steel substrate 14 may also have a second surface 116 spaced opposite and apart from the faying interface 20 that is not penetrated by the resistance spot weld joint 16. That is, the resistance spot weld joint 16 may be disposed within each of the first steel substrate 12 and the second steel substrate 14 at the faying interface 20, but may not penetrate the outer second surface 116 of each of the first steel substrate 12 and the second steel substrate 14. For example, penetration of the resistance spot weld joint 16 within each of the first steel substrate 12 and the second steel substrate 14 from the faying interface 20 may not exceed about 90% of either of the first thickness 22 (FIG. 1) and the second thickness 24 (FIG. 1), respectively, so as to minimize and/or prevent weld surface cracks and extend an operating life of the first welding electrode 110 and the second welding electrode 210. More specifically, the penetration of the resistance spot weld joint 16 may not exceed about 50% of either of the first thickness 22 and the second thickness 24 so as to optimally minimize weld cracks and maximize operating life of the welding electrode 110, 210.

Referring again to FIG. 5, the first steel substrate 12 may include a heat-affected zone 118 adjacent the resistance spot weld joint 16. As used herein, the terminology "heat-affected zone" refers to an area of the first steel substrate 12 having a microstructure altered by exposure to heat, e.g., the first, second, third, fourth, and fifth quantities 80, 84, 88, 92, 94 of resistance heat generated during the aforementioned method. That is, the heat-affected zone 118 may be formed in the first steel substrate 12 due to heat build-up and subsequent cooling of the first steel substrate 12. As shown in FIG. 5, the heat-affected zone 118 may include a region of the first steel substrate 12 between the resistance spot weld joint 16 and a remainder of the first steel substrate 12 that is unaffected by heat. Stated differently, the heat-affected zone 118 may include a region of the first steel substrate 12 adjacent columnar grains 120 (FIG. 7) of the resistance spot weld joint 16. In particular, the heat-affected zone 118 may include regions that upon heating form coarse grained austenite 122 (FIG. 7) and fine grained austenite 124 (FIG. 7), and may include steel partially-transformed to austenite (not shown) and/or annealed base steel (not shown).

Therefore, referring again to FIG. 5, the heat-affected zone 118 is adjacent the resistance spot weld joint 16 within the first steel substrate 12 and has a boundary 126. The boundary 126 may define a transition within the first steel substrate 12 between fine grain steel (e.g., the fine grained austenite 124 of FIG. 7) and coarse grain steel (e.g., the coarse grained austenite 122 of FIG. 7). In addition, the boundary 126 may extend from the faying interface 20. For example, as shown in FIG. 5, the boundary 126 may abut and originate at the faying interface 20, and extend through the first steel substrate 12 to the outer second surface 116 of the first steel substrate 12. The intersection of the boundary 126 and the faying interface 20 (designated by opposite points 128 and 130 in FIG. 5) may be referred to as a notch root, and may designate a possible initiation point for crack formation and propagation at the faying interface 20.

With continued reference to FIG. 5, the boundary 126 and the faying interface 20 may define an angle 132 therebetween of greater than about 75°. Further, the angle 132 may be less than or equal to about 170° so that the boundary 126 is not parallel to the faying interface 20. For example, the angle 132 between the boundary 126 and the faying interface 20 may be from about 80° to about 120°. Consequently, inducing each of the aforementioned quantities 80, 84, 88, 92, 94 of resistance heat may distribute the first quantity 80 of resistance heat over the first area 82, the second quantity 84 of resistance heat over the second area 86, and the third quantity 88 of resistance heat over the third area 90 to thereby form the resistance spot weld joint 16 that penetrates the first steel substrate 12 and the second steel substrate 14 at the faying interface 20 so that the first steel substrate 12 has the heat-affected zone 118 adjacent the resistance spot weld joint 16 having the boundary 126, wherein the boundary 126 and the faying interface 20 define an angle 132 therebetween of greater than about 75°.

Without intending to be limited by theory, the angle 132 and resulting shape of the heat-affected zone 118 may slow crack propagation within the resistance spot weld joint 16 and therefore extend an operating life of the workpiece 18. That is, the angle 132 and resulting shape of the heat-affected zone 118 may align the boundary 126 with a direction of minimized energy release and stress intensity within the resistance spot weld joint 16 so as to minimize crack growth rates and maximize the fatigue life of the resistance spot weld joint 16. Stated differently, the angle 132 may deflect and propagate any cracks originating at the faying interface 20 along the boundary 126 of the heat-affected zone 118, and thereby minimize crack growth rates of the workpiece 18.

In addition, an advancing crack (not shown) that does not deflect along the boundary 126 of the heat-affected zone 118 may encounter a hard resistance spot weld joint material, which may also contribute to comparatively low crack growth rates and an increase in fatigue life. That is, the resistance spot weld joint 16 may provide at least two defenses to crack formation and growth. First, the resistance spot weld joint 16 may encourage any crack propagation along the boundary 126 instead of allowing crack propagation along other locations of the first steel substrate 12. Secondly, if a crack does not propagate along the boundary 126, but rather initiates at the notch root 128, 130 (FIG. 5) and propagates in a direction that is not parallel to the boundary 116, the crack may encounter the comparatively harder columnar grains 120 (FIG. 7), coarse grained austenite 122 (FIG. 7), and/or fine grained austenite 124 (FIG. 7) of the resistance spot weld joint 16 and be arrested from further growth. Therefore, the resistance spot weld joint 16 may redirect crack growth and exhibit a resulting excellent fatigue life and tensile strength in peel, and arrest crack growth in fatigue if the crack deviates into the resistance spot weld joint 16 or nugget.

Thus, as set forth in more detail below, the workpiece 18 joined by the resistance spot weld joint 16 formed by the aforementioned method has excellent tensile strength in peel and fatigue strength without requiring an increased first thickness 22 (FIG. 1) of the first steel substrate 12. As used herein, the terminology "tensile strength in peel" refers to the maximum tensile stress, e.g., applied vertically in the direction of arrows 134 in FIG. 5, that the workpiece 18 can withstand without tearing apart. And, the terminology "fatigue strength" refers to the maximum stress that can be sustained by the workpiece 18 for a specific number of cycles without tearing apart, wherein the stress is completely reversed within each cycle.

Figure 7:
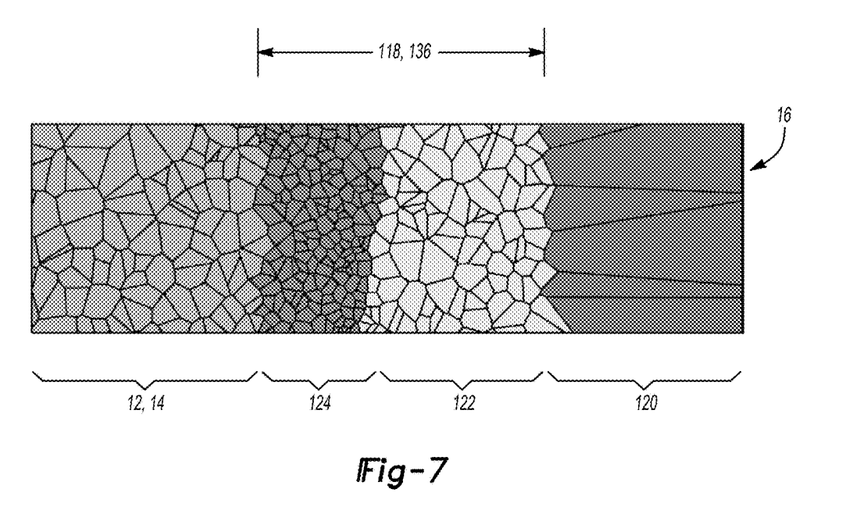
FIG. 7 is a schematic magnified microstructural view of a portion of the workpiece of FIG. 5.

Referring again to FIG. 5, the second steel substrate 14 of the workpiece 18 may have a second heat-affected zone 136 adjacent the resistance spot weld joint or nugget 16. As used herein, the terminology "second heat-affected zone" refers to an area of the second steel substrate 14 having a microstructure altered by exposure to heat, e.g., by the first, second, third, fourth, and fifth quantities 80, 84, 88, 92, 94 of resistance heat generated during the aforementioned method. That is, the second heat-affected zone 136 may be formed in the second steel substrate 14 due to heat build-up and subsequent cooling of the second steel substrate 14. As shown in FIG. 7, the second heat-affected zone 136 may include a region of the second steel substrate 14 between the resistance spot weld joint 16 and a remainder of the second steel substrate 14 that is unaffected by heat. Stated differently, the second heat-affected zone 136 may include a region of the second steel substrate 14 adjacent columnar grains 120 (FIG. 7) of the resistance spot weld joint or nugget 16. More specifically, the second heat-affected zone 136 may include regions that upon heating form coarse grained austenite 122 (FIG. 7) and fine grained austenite 124 (FIG. 7), and may include steel partially-transformed to austenite (not shown) and/or annealed base steel (not shown).

Referring again to FIG. 5, the second heat-affected zone 136 is adjacent the resistance spot weld joint or nugget 16 within the second steel substrate 14 and has a second boundary 138. The second boundary 138 may, for example, define a transition with the second steel substrate 14 between fine grain steel (e.g., the fine grained austenite 124 of FIG. 7) and coarse grain steel (e.g., the coarse grained austenite 122 of FIG. 7). Therefore, as shown in FIG. 5, each of the boundary 126 of the heat-affected zone 118 and the second boundary 138 of the second heat-affected zone 136 may define a transition with the first steel substrate 12 and the second steel substrate 14, respectively, between fine grain steel and coarse grain steel.

Further, the second boundary 138 may extend from the faying interface 20. For example, as shown in FIG. 5, the second boundary 138 may abut and originate at the faying interface 20, and extend through the second steel substrate 14 to the outer second surface 116 of the second steel substrate 14. For example, the second boundary 138 may intersect the boundary 124 and faying interface 20 at points 128 and 130 in FIG. 5, i.e., at the notch root. Therefore, each of the boundary 124 of the heat-affected zone 118 and the second boundary 138 of the second heat-affected zone 136 may extend from the faying interface 20 of the workpiece 18.

Referring again to FIG. 5, the second boundary 138 and the faying interface 20 may define a second angle 140 therebetween of greater than about 75°. Further, the second angle 140 may be less than or equal to about 170° so that the second boundary 138 is not parallel to the faying interface 20. For example, the second angle 140 between the second boundary 138 and the faying interface 20 may be from about 80° to about 120°.

Therefore, as shown in FIG. 5, each of the angle 132 and the second angle 140 may be from about 80° to about 120°. Further, the second angle 140 may be the same or different than the angle 132, depending on the formation and waist diameter 114 (FIG. 1) of the resistance spot weld joint 16. For example, the angle 132 may differ from the second angle 140 by less than about 10°. Therefore, as shown in FIG. 5, the resistance spot weld joint 16 may have a shape that is also different from the shape of the second heat-affected zone 136. Alternatively, although not shown, the second heat-affected zone 136 may be symmetrical with the resistance spot weld joint 16. Regardless, as shown in FIG. 5, the heat-affected zone 118 and the second heat-affected zone 136 may combine to form a substantially hourglass shape.

Again without intending to be limited by theory, the second angle 140 and resulting shape of the second heat-affected zone 136 may slow crack propagation within the resistance spot weld joint 16 and therefore extend an operating life of the workpiece 18. That is, the second angle 140 and resulting shape of the second heat-affected zone 136 may align the second boundary 138 with a direction of minimized energy release and stress intensity within the resistance spot weld joint 16 so as to minimize crack growth rates and maximize the fatigue life of the resistance spot weld joint 16. Stated differently, the second angle 140 may deflect and propagate any cracks originating at the faying interface 20 along the second boundary 138 of the second heat-affected zone 136. For example, an advancing crack (not shown) that does not deflect along the second boundary 138 of the second heat-affected zone 136 may encounter a hard resistance spot weld joint material, which may also contribute to comparatively low crack growth rates and an increase in fatigue life.

That is, the resistance spot weld joint 16 may provide at least two defenses to crack formation and growth. First, the resistance spot weld joint 16 may encourage any crack propagation along the second boundary 138 instead of allowing crack propagation along other locations of the second steel substrate 14. Secondly, if a crack does not propagate along the second boundary 138, but rather initiates at the notch root 128, 130 (FIG. 5) and propagates in a direction not parallel to the second boundary 138, the crack may encounter the comparatively harder columnar grains 120 (FIG. 7), coarse grained austenite 122 (FIG. 7), and/or fine grained austenite 124 (FIG. 7) of the resistance spot weld joint 16 and be arrested from further growth. Therefore, the resistance spot weld joint 16 may redirect crack growth and exhibit a resulting excellent fatigue life and tensile strength in peel, and arrest crack growth in fatigue if the crack deviates into the resistance spot weld joint 16 or nugget, Thus, the workpiece 18 joined by the resistance spot weld joint 16 formed by the aforementioned method has excellent tensile strength in peel and fatigue strength without requiring an increased second thickness 24 (FIG. 1) of the second steel substrate 14. The hourglass shape of the combined heat-affected zone 118 and second heat-affected zone 136 provides a crack propagation path that extends the fatigue life of the workpiece 18 as compared to workpieces (not shown) having angles (not shown) at the notch root of less than or equal to about 75°.

Since the angle 132 and second angle 140 may each align the boundary 126 and second boundary 138, respectively, along a direction of minimized energy release and stress intensity within the resistance spot weld joint 16, the resistance spot weld joint 16 has an excellent fatigue life, i.e., the number of cycles of stress that can be sustained by the workpiece 18 without tearing apart and/or unacceptable reduction in the tensile strength in peel of the resistance spot weld joint 16. For example, the resistance spot weld joint 16 may have a fatigue life of up to about 100,000 cycles when subjected to a cyclic tensile shear load (represented by arrows 134 in FIG. 5) of about 1,200 lbs/cycle applied to each of the first steel substrate 12 and the second steel substrate 14, and a fatigue life of up to about 7,000,000 cycles when subjected to a cyclic tensile shear load (arrows 134) of about 600 lbs/cycle applied to each of the first steel substrate 12 and the second steel substrate 14, wherein a ratio (R) of a minimum applied tensile shear load to a maximum applied tensile shear load is about 0.1. Further, the resistance spot weld joint 16 may have a fatigue life of up to about 700,000 cycles when subjected to a cyclic tensile shear load (arrows 134) of about 800 lbs/cycle applied to each of the first steel substrate 12 and the second steel substrate 14, wherein R is about 0.1. In this example, each of the first steel substrate 12 and the second steel substrate 14 may be formed from DP600 (dual phase) steel, and each of the first thickness 22 and the second thickness 24 may be about 1.6 mm.

The welding electrode 10 and method enable formation of resistance spot weld joints 16 that exhibit excellent high-cycle fatigue life, excellent tensile strength in peel, and a reduced susceptibility to weld joint surface crack formation. For example, the hourglass-shaped resistance spot weld joint 16 formed by the welding electrode 10 and method is optimized to withstand a high number of cycles of tensile shear load applied to each of the first steel substrate 12 and the second steel substrate 14. The welding electrode 10 and method enable formation of a resistance spot weld joint 16 that optimally penetrates the first steel substrate 12 and the second steel substrate 14 at the faying interface 20 to thereby join the second steel substrate 14 to the first steel substrate 12. More specifically, the method increases the first ratio and the second ratio and promotes formation of the resistance spot weld joint 16 having, for example, an hourglass shape. That is, each of the first steel substrate 12 and the second steel substrate 14 may have the heat-affected zone 118, 136 adjacent the resistance spot weld joint 16 and having the boundary 126, 138, wherein the boundary 126, 138 and the faying interface 20 may define the angle 132, 140 therebetween of greater than about 75°, e.g., from about 80° to about 120°. The improved welding electrode 10 and method maximize the angle 132 between the boundary 126, 138 and the faying interface 20 so that the heat-affected zone 118 within the first steel substrate 12 may combine with the second heat-affected zone 136 within the second steel substrate 14 to form a substantially hourglass shape. That is, the first quantity of resistance heat 80 and the second quantity of resistance heat 84 are distributed over an optimal portion, i.e., the first area 82 and second area 86, of the first welding interface 76 and the second welding interface 78, respectively, to form to the resistance spot weld joint 16.

The welding electrode 10 and method enable downgaging, i.e., reducing the first- and second-thicknesses 22, 24, of the first and second steel substrates 12, 14, without an accompanying loss of fatigue strength. The improved welding electrode 10 and method are suitable for applications requiring excellent tensile strength in peel, fatigue strength, and fatigue life without an accompanying increased thickness of steel substrates 12, 14. The method optimally controls welding parameters to increase the shoulder diameter 112 of the resistance spot weld joint 16 while maintaining the waist diameter 114 at the faying interface 20 (FIG. 1). In addition, the improved welding electrode 10 and method redirect weld current flux lines and distribute contact pressure and contact resistance across the first and second welding interfaces 76, 78 so as to generate the aforementioned optimal distribution of resistance heat at the first and second welding interfaces 76, 78.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming a resistance spot weld joint in a workpiece including a first steel substrate disposed in contact with a second steel substrate to define a faying interface therebetween, the method comprising:

disposing the workpiece between a first welding electrode and a second welding electrode, wherein each of the first welding electrode and the second welding electrode includes;

an electrode holder; and an electrode cap removably attached to the electrode holder and having a central longitudinal axis, the electrode cap including;

a body having a proximal end and a welding surface spaced apart from the proximal end, wherein the welding surface is substantially smooth and free from any grooves defined therein, and has a first diameter of from about 7 mm to about 10 mm, a first radius of curvature, and a second radius of curvature that is different from the first radius of curvature; and a skirt portion extending away from the body along the central longitudinal axis and configured to bear against the electrode holder to thereby removably attach the electrode cap to the electrode holder;

wherein the skirt portion has a first face that is substantially parallel to the central longitudinal axis and spaced apart from the welding surface;

wherein the body has a second face interconnecting the first face and the welding surface;

wherein the body tapers from the first face to the welding surface along the second face;

contacting the workpiece with the welding surface of each of the first welding electrode and the second welding electrode so as to define a first welding interface between the first steel substrate and the first welding electrode, and a second welding interface between the second steel substrate and the second welding electrode;

inducing each of a first quantity of resistance heat over a first area of the first welding interface, a second quantity of resistance heat over a second area of the second welding interface, a third quantity of resistance heat over a third area of the faying interface, a fourth quantity of resistance heat within the first steel substrate, and a fifth quantity of resistance heat within the second steel substrate;

wherein each of the third quantity of resistance heat, the fourth quantity of resistance heat, and the fifth quantity of resistance heat is less than either of the first quantity of resistance heat and the second quantity of resistance heat; and maximizing each of a first ratio of the first area to the third area, and a second ratio of the second area to the third area to thereby form the resistance spot weld joint in the workpiece.

2. The method of claim 1, further including, after contacting, applying a first force to the workpiece to thereby squeeze the workpiece between the first welding electrode and the second welding electrode for a first duration.

3. The method of claim 2, further including, after applying the first force, applying a substantially constant second force to the workpiece for a second duration.

4. The method of claim 3, further including, simultaneous to applying the substantially constant second force, applying a weld current to the workpiece through the first welding electrode and the second welding electrode for the second duration to thereby induce the first quantity of resistance heat over the first area of the first welding interface, the second quantity of resistance heat over the second area of the second welding interface, the third quantity of resistance heat over the third area of the faying interface, the fourth quantity of resistance heat within the first steel substrate, and the fifth quantity of resistance heat within the second steel substrate.

5. The method of claim 4, wherein applying the weld current includes passing the weld current through the electrode holder to the workpiece in a single continuous pulse over an entirety of the second duration.

6. The method of claim 4, wherein applying the weld current distributes a contact pressure over the first area and the second area respectively to direct the weld current from the electrode cap to the first steel substrate and the second steel substrate and thereby generate the first quantity of resistance heat at the first welding interface and the second quantity of resistance heat at the second welding interface.

7. The method of claim 4, further including, after applying the substantially constant second force, applying a third force to the workpiece for a third duration.

8. The method of claim 7, wherein applying the first force, applying the substantially constant second force, and applying the third force to the workpiece includes increasing the first quantity of resistance heat at the first area and increasing the second quantity of resistance heat at the second area.

9. The method of claim 7, wherein applying the first force, applying the substantially constant second force, and applying the third force includes increasing the first area and the second area.

10. The method of claim 7, wherein applying the first force, applying the substantially constant second force, and applying the third force to the workpiece includes minimizing a contact pressure between the first welding electrode and the first steel substrate and between the second welding electrode and the second steel substrate.

11. The method of claim 7, further including, after applying the third force, releasing the first welding electrode and the second welding electrode from contact with the workpiece for a fourth duration to thereby form the resistance spot weld joint in the workpiece.

12. The method of claim 1, wherein inducing further includes heating the first welding interface and the second welding interface such that the first welding interface and the second welding interface are each comparatively hotter than the faying interface.

13. The method of claim 1, wherein inducing includes distributing the first quantity of resistance heat over the first area, the second quantity of resistance heat over the second area, and the third quantity of resistance heat over the third area to thereby form the resistance spot weld joint that penetrates the first steel substrate and the second steel substrate at the faying interface so that the first steel substrate has a heat-affected zone adjacent the resistance spot weld joint having a boundary, wherein the boundary and the faying interface define an angle therebetween of greater than about 75°.

14. A method of forming a resistance spot weld joint in a workpiece including a first steel substrate disposed in contact with a second steel substrate to define a faying interface therebetween, the method comprising:

disposing the workpiece between a first welding electrode and a second welding electrode, wherein each of the first welding electrode and the second welding electrode includes;

an electrode holder; and an electrode cap removably attached to the electrode holder and having a central longitudinal axis, the electrode cap including;

a body having a proximal end and a welding surface spaced apart from the proximal end, wherein the welding surface is substantially smooth and free from any grooves defined therein, and has a first diameter of from about 7 mm to about 10 mm, a first radius of curvature, and a second radius of curvature that is different from the first radius of curvature; and a skirt portion extending away from the body along the central longitudinal axis and configured to bear against the electrode holder to thereby removably attach the electrode cap to the electrode holder;

wherein the skirt portion has a first face that is substantially parallel to the central longitudinal axis and spaced apart from the welding surface;

wherein the body has a second face interconnecting the first face and the welding surface;

wherein the body tapers from the first face to the welding surface along the second face;

wherein the welding surface includes a protuberance spaced apart from the second face and having the first radius of curvature, and a shoulder adjoining the protuberance;

contacting the workpiece with the welding surface of each of the first welding electrode and the second welding electrode so as to define a first welding interface between the first steel substrate and the first welding electrode, and a second welding interface between the second steel substrate and the second welding electrode;

inducing each of a first quantity of resistance heat over a first area of the first welding interface, a second quantity of resistance heat over a second area of the second welding interface, a third quantity of resistance heat over a third area of the faying interface, a fourth quantity of resistance heat within the first steel substrate, and a fifth quantity of resistance heat within the second steel substrate;

wherein each of the third quantity of resistance heat, the fourth quantity of resistance heat, and the fifth quantity of resistance heat is less than either of the first quantity of resistance heat and the second quantity of resistance heat; and maximizing each of a first ratio of the first area to the third area, and a second ratio of the second area to the third area to thereby form the resistance spot weld joint in the workpiece.

15. The method of claim 14, further including, after contacting:

applying a first force to the workpiece to thereby squeeze the workpiece between the first welding electrode and the second welding electrode for a first duration;

after applying the first force, applying a substantially constant second force to the workpiece for a second duration;

after applying the substantially constant second force, applying a third force to the workpiece for a third duration; and after applying the third force, releasing the first welding electrode and the second welding electrode from contact with the workpiece for a fourth duration to thereby form the resistance spot weld joint in the workpiece.

16. The method of claim 15, further including, simultaneous to applying the substantially constant second force, applying a weld current to the workpiece through the first welding electrode and the second welding electrode for the second duration to thereby induce the first quantity of resistance heat over the first area of the first welding interface, the second quantity of resistance heat over the second area of the second welding interface, the third quantity of resistance heat over the third area of the faying interface, the fourth quantity of resistance heat within the first steel substrate, and the fifth quantity of resistance heat within the second steel substrate.

17. The method of claim 16, further including not applying the weld current through the first welding electrode and the second welding electrode for the first duration, the third duration, and the fourth duration.

18. The method of claim 14, wherein the resistance spot weld joint has a shoulder diameter and a waist diameter, and further wherein maximizing includes shaping the resistance spot weld joint so that the shoulder diameter is larger than the waist diameter.

19. A method of forming a resistance spot weld joint in a workpiece including a first steel substrate disposed in contact with a second steel substrate to define a faying interface therebetween, the method comprising:

disposing the workpiece between a first welding electrode and a second welding electrode, wherein each of the first welding electrode and the second welding electrode includes;

an electrode holder; and an electrode cap removably attached to the electrode holder and having a central longitudinal axis, the electrode cap including;

a body having a proximal end and a welding surface spaced apart from the proximal end, wherein the welding surface is substantially smooth and free from any grooves defined therein, and has a first diameter of from about 7 mm to about 10 mm, a first radius of curvature, and a second radius of curvature that is different from the first radius of curvature; and a skirt portion extending away from the body along the central longitudinal axis and configured to bear against the electrode holder to thereby removably attach the electrode cap to the electrode holder;

wherein the skirt portion has a first face that is substantially parallel to the central longitudinal axis and spaced apart from the welding surface;

wherein the body has a second face interconnecting the first face and the welding surface;

wherein the body tapers from the first face to the welding surface along the second face;

wherein the second radius of curvature is greater than the first radius of curvature;

wherein the welding surface includes a protuberance spaced apart from the second face and having the first radius of curvature, and a shoulder adjoining the protuberance;

contacting the workpiece with the welding surface of each of the first welding electrode and the second welding electrode so as to define a first welding interface between the first steel substrate and the first welding electrode, and a second welding interface between the second steel substrate and the second welding electrode;

inducing each of a first quantity of resistance heat over a first area of the first welding interface, a second quantity of resistance heat over a second area of the second welding interface, a third quantity of resistance heat over a third area of the faying interface, a fourth quantity of resistance heat within the first steel substrate, and a fifth quantity of resistance heat within the second steel substrate;

wherein each of the third quantity of resistance heat, the fourth quantity of resistance heat, and the fifth quantity of resistance heat is less than either of the first quantity of resistance heat and the second quantity of resistance heat; and maximizing each of a first ratio of the first area to the third area, and a second ratio of the second area to the third area to thereby form the resistance spot weld joint in the workpiece.

20. The method of claim 19, wherein inducing includes distributing the first quantity of resistance heat over the first area, the second quantity of resistance heat over the second area, and the third quantity of resistance heat over the third area to thereby form the resistance spot weld joint that penetrates the first steel substrate and the second steel substrate at the faying interface so that the first steel substrate has a heat-affected zone adjacent the resistance spot weld joint having a boundary, wherein the boundary and the faying interface define an angle therebetween of greater than about 75°.

* * * * *